(12) United States Patent
Han et al.

(10) Patent No.: US 8,285,095 B2
(45) Date of Patent: Oct. 9, 2012

(54) OPTICAL-ELECTRICAL HYBRID TRANSMISSION CABLE

(75) Inventors: Wen-Du Han, Kunshan (CN); Wei Yao, Kunshan (CN); Pei Tsao, La Harbra, CA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 276 days.

(21) Appl. No.: 12/830,462

(22) Filed: Jul. 6, 2010

(65) Prior Publication Data

US 2012/0008906 A1    Jan. 12, 2012

(51) Int. Cl.
*G02B 6/44* (2006.01)

(52) U.S. Cl. ......... 385/101; 385/100; 385/106; 385/112

(58) Field of Classification Search .................. 385/101, 385/106, 112
See application file for complete search history.

(56) References Cited

U.S. PATENT DOCUMENTS

| | | | | |
|---|---|---|---|---|
| 5,325,457 A * | 6/1994 | Bottoms et al. | ............... | 385/113 |
| 5,630,003 A * | 5/1997 | Arroyo | .................. | 385/113 |
| 5,917,977 A * | 6/1999 | Barrett | .................. | 385/101 |
| 6,415,084 B1 * | 7/2002 | Iwasaki | .................. | 385/101 |
| 6,738,547 B2 * | 5/2004 | Spooner | .................. | 385/101 |
| 7,242,831 B2 * | 7/2007 | Fee | .................. | 385/103 |
| 7,643,713 B2 | 1/2010 | Nexans | | |
| 8,000,573 B2 * | 8/2011 | Roscoe | .................. | 385/101 |
| 2004/0213528 A1 * | 10/2004 | Bourget | .................. | 385/103 |
| 2005/0201696 A1 * | 9/2005 | Fee | .................. | 385/101 |
| 2006/0031611 A1 * | 2/2006 | Konda | .................. | 710/72 |
| 2006/0193572 A1 * | 8/2006 | Mjelstad | .................. | 385/101 |
| 2009/0214168 A1 * | 8/2009 | Roscoe | .................. | 385/101 |
| 2009/0242861 A1 * | 10/2009 | Kochan et al. | .................. | 254/293 |
| 2010/0329614 A1 * | 12/2010 | Keller et al. | .................. | 385/101 |
| 2012/0008904 A1 * | 1/2012 | Han et al. | .................. | 385/101 |
| 2012/0008905 A1 * | 1/2012 | Han et al. | .................. | 385/101 |
| 2012/0008906 A1 * | 1/2012 | Han et al. | .................. | 385/101 |

\* cited by examiner

*Primary Examiner* — Rhonda Peace

(74) *Attorney, Agent, or Firm* — Wei Te Chung; Ming Chieh Chang

(57) ABSTRACT

An optical-electrical hybrid transmission cable (100), comprising: an insulative layer (2); a shielding layer located on an inner side of the insulative layer; a pair of signal wires (6) disposed in the shielding layer and twisted together; a power wire (7) and a grounding wire (8) disposed in the shielding layer and arranged side by side; two bare optical fibers (5) disposed in the shielding layer and spaced apart from each other; and a plurality of fillers (9) disposed in the shielding layer and arranged in a discrete manner.

14 Claims, 1 Drawing Sheet

OPTICAL-ELECTRICAL HYBRID TRANSMISSION CABLE

FIELD OF THE INVENTION

The present invention relates to a cable, and more particularly to an optical-electrical hybrid transmission cable.

DESCRIPTION OF PRIOR ART

Recently, as the data transmitting rate between the PC and PC or PC and external electrical device is required faster and faster, the traditional cable connecting with the PC and PC or PC and external device can not meet the high data transmitting rate requirements.

As discussed above, an improved optical-electrical hybrid transmission cable overcoming the shortages of existing technology is needed.

SUMMARY OF THE INVENTION

Accordingly, an object of the present invention is to provide optical-electrical hybrid transmission cable with high speed signals transmission.

In order to achieve the above-mentioned objects, an optical-electrical hybrid transmission cable, comprises an optical-electrical hybrid transmission cable, comprises an insulative layer; a shielding layer located on an inner side of the insulative layer; a pair of signal wires disposed in the shielding layer and twisted together; a power wire and a grounding wire disposed in the shielding layer and arranged side by side; two bare optical fibers disposed in the shielding layer and spaced apart from each other. And a plurality of fillers are disposed in the shielding layer and arranged in a discrete manner.

Other objects, features and advantages of the invention will be apparent from the following detailed description taken in connection with the accompanying drawings.

DETAILED DESCRIPTION OF PREFERRED EMBODIMENTS

Figure 1:
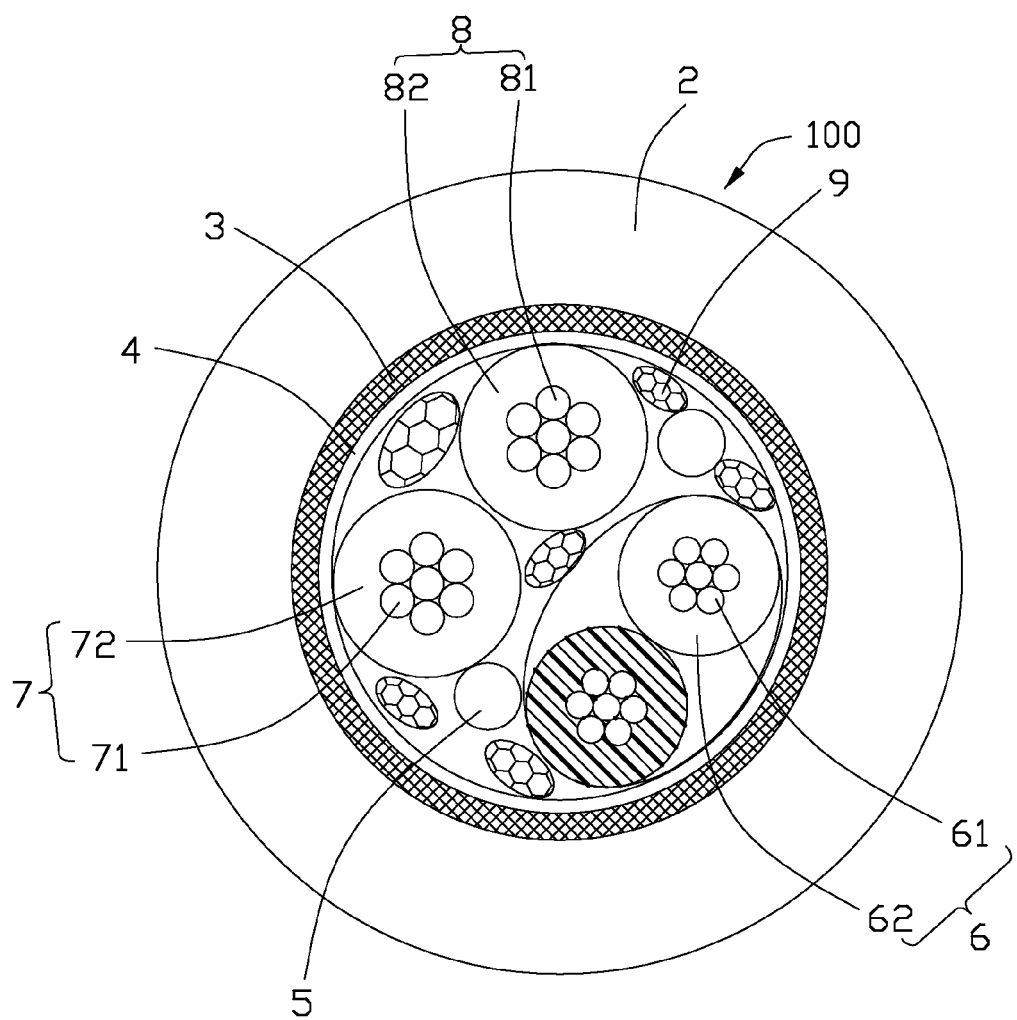
FIG. 1 is a cross-section view of an optical-electrical hybrid transmission cable in accordance with the present invention.

Reference will now be made to the drawing figures to describe the present invention in detail.

Referring to FIG. 1, an optical-electrical hybrid transmission cable 100 in accordance with the present invention comprises an insulative layer 2, a shielding layer from outside to inside, and two bare optical fibers 5, a pair of signal wires 6 twisted together, a power wire 7 and a grounding wire 8 disposed in the metallic mylar layer 4 and arranged along a circumferential direction. The shielding layer includes a metallic braided layer 3 and a metallic mylar layer 4. The metallic mylar layer 4 is disposed on an inner side of the metallic braided layer 3. The optical-electrical hybrid transmission cable 100 further comprises a plurality of fillers 9 located in the metallic mylar layer 4. The two bare fibers 5, the pair of signal wires 6, the power wire 7, the grounding wire 8 and the fillers 9 are stranded together by the metallic mylar layer 4.

The metallic mylar layer 4 is made of aluminum foil and surrounds the bare optical fibers 5, the pair of signal wires 6, the power wire 7, the grounding wire 8 and the fillers 9. The metallic mylar layer 4 is to protect the signal transmission of the optical-electrical hybrid transmission 100 from external electromagnetic interference, but also to prevent the optical-electrical hybrid transmission cable 100 from radiating to the exterior.

The metallic braided layer 3 is made of copper and encloses the metallic mylar layer 4 and further protect the signal transmission of the optical-electrical hybrid transmission cable 100 from external electromagnetic interference, but also to prevent the optical-electrical hybrid transmission cable 100 from radiating to the exterior.

The two bare optical fibers 5 are spaced apart from each other by the pair of signal wires 6, the power wire 7 and the grounding wire 8 and used for optical signal transmission.

The pair of signal wires 6 is a twisted-pair, in this embodiment, the pair of signal wires 6 are UTP (Unshielded Twisted Paired) wires. Each signal wire 6 has a plurality of copper wires 61 stranded with one another and an insulation 62 enclosing the plurality of copper wires 61.

The power wire 7 includes a plurality of copper wires 71 stranded together and an insulation 72 enclosing the plurality of copper wires 71. The grounding wire 8 also includes a plurality of copper wires 81 stranded together and an insulation 82 enclosing the plurality of copper wires 81. The power wire 7 and the grounding wire 8 are arranged side by side. The power wire 7, grounding wire 8 and the pair of signal wires 6 are all used for electrical signal transmission.

Each filler 9 is formed by a strand fibers, in this embodiment, the filler 9 is made of Kevlar material. The filler 9 has a high tensile strength being disposed in the optical-electrical hybrid transmission cable 100. The plurality of fillers 9 disposed in the metallic mylar layer 4 are arranged in a discrete manner. The plurality of fillers 9 also can keep a roundness of the optical-electrical hybrid transmission cable 100.

As the optical-electrical hybrid transmission cable 100 transmitting not only electrical signal but also optical signal, so the data transmitting speed of the optical-electrical hybrid transmission cable 100 is higher than the cable only transmitting electrical signal. So, the optical-electrical hybrid transmission cable 100 can meet the high data transmitting rate requirements between the PC and PC or PC and PC and external device.

It will be understood that the invention may be embodied in other specific forms without departing from the spirit or central characteristics thereof The present examples and embodiments, therefore, are to be considered in all respects as illustrative and not restrictive, and the invention is not to be limited to the details given herein.

What is claimed is:

1. An optical-electrical hybrid transmission cable, comprising:
    an insulative layer;
    a shielding layer located on an inner side of the insulative layer;
    a pair of signal wires disposed in the shielding layer and twisted together;
    a power wire and a grounding wire disposed in the shielding layer and arranged side by side;
    two bare optical fibers disposed in the shielding layer and spaced apart from each other; and
    a plurality of fillers disposed in the shielding layer and arranged in a discrete manner.

2. The optical-electrical hybrid transmission cable as recited in claim 1, wherein the shielding layer comprises a metallic braided layer disposed on an inner side of the insulative layer and a metallic mylar layer disposed on an inner side of the metallic braided layer.

3. The optical-electrical hybrid transmission cable as recited in claim 2 wherein the two bare optical fibers, the pair of signal wires, the power wire and the grounding wire are arranged along a circumferential direction.

4. The optical-electrical hybrid transmission cable as recited in claim 2, wherein the pair of signal wires are unshielded twisted paired wires and used for transmitting differential signal.

5. The optical-electrical hybrid transmission cable as recited in claim 2, wherein the two bare fibers are used for optical signal transmission, the pair of signal wires the power wire and the grounding wire are used for electrical signal transmission.

6. The optical-electrical hybrid transmission cable as recited in claim 1, wherein each filler is a strand Kevlar fibers.

7. The optical-electrical hybrid transmission cable as recited in claim 1, wherein the two bare optical fibers are spaced apart from each other by the pair of signal wires, the power wire and the grounding wire.

8. A hybrid cable, comprising:
an insulative layer;
a metallic braided layer disposed on an inner side of the insulative layer;
a metallic mylar layer disposed on an inner side of the metallic braided layer;
two bare optical fibers, a pair of signal wires, a power wire and a grounding wire disposed in the metallic mylar layer and arranged along a circumferential direction; and
a plurality of bare optical fibers disposed in the metallic mylar layer and arranged in a discrete manner.

9. The hybrid cable as recited in claim 8, wherein the power wire and the grounding wire are arranged side by side.

10. The hybrid cable as recited in claim 8, wherein the pair of signal wires are twisted together.

11. A hybrid cable comprising:
an inner segment and an outer segment coaxially radially sandwiching a middle segment therebetween;
the outer segment being of an insulative layer;
the middle segment being of at least one metallic layer for shielding; and
the inner segment including a plurality of bare optical fibers, a plurality of signal wires and a plurality of power and ground wires commonly surrounding a filler.

12. The hybrid cable as claimed in claim 11, wherein the inner segment is essentially symmetrically arranged with regard to an imaginary centerline.

13. The hybrid cable as claimed in claim 12, wherein said signal wires, and said power and ground wires are respectively symmetrically arranged by two sides of said imaginary centerline while the optical cable is of a single piece aligned with said centerline.

14. The hybrid cable as claimed in claim 11, wherein the filler further occupies space between the metallic layer and said signal wires and said power and ground wires circumferentially.

* * * * *